UNITED STATES PATENT OFFICE.

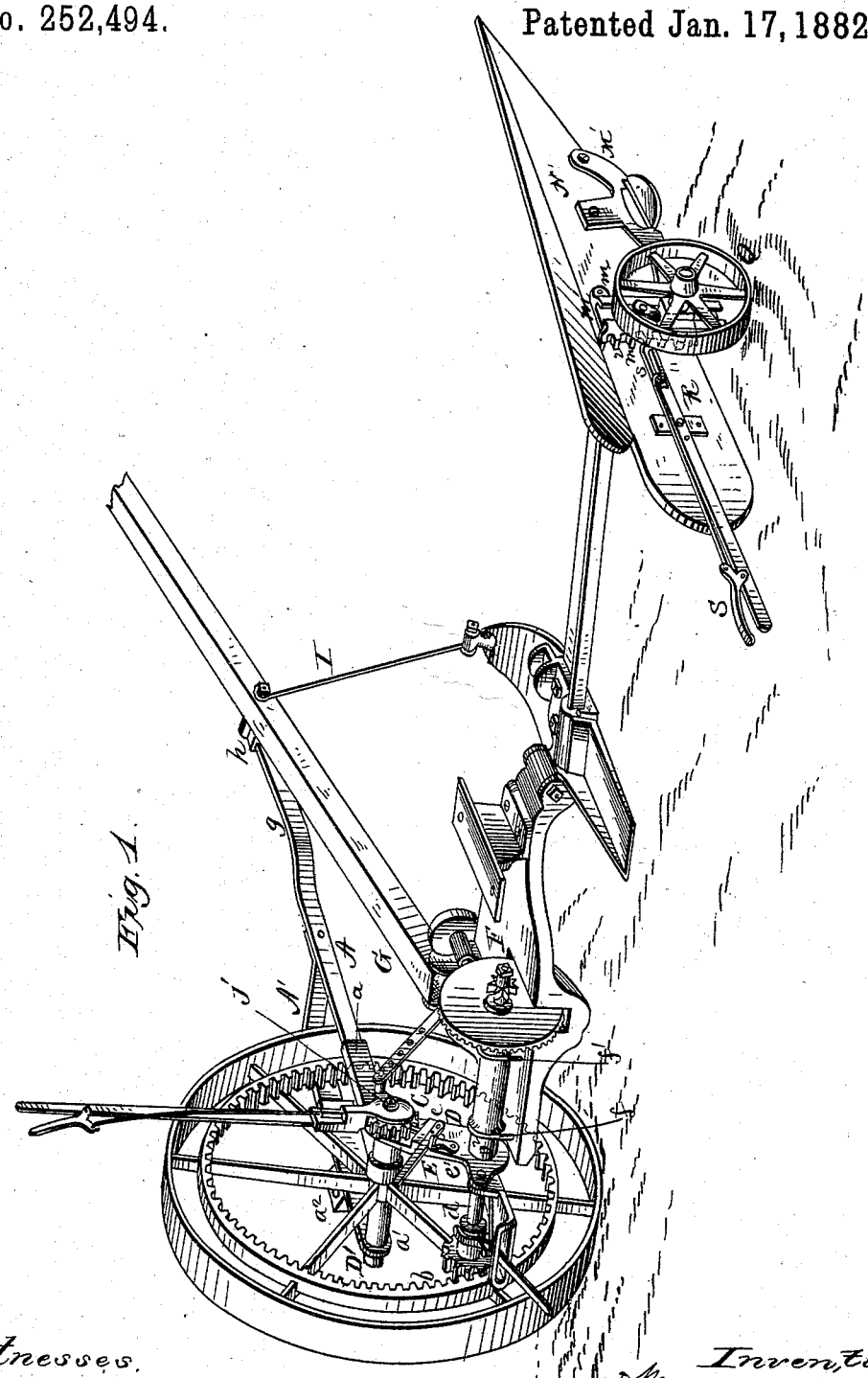

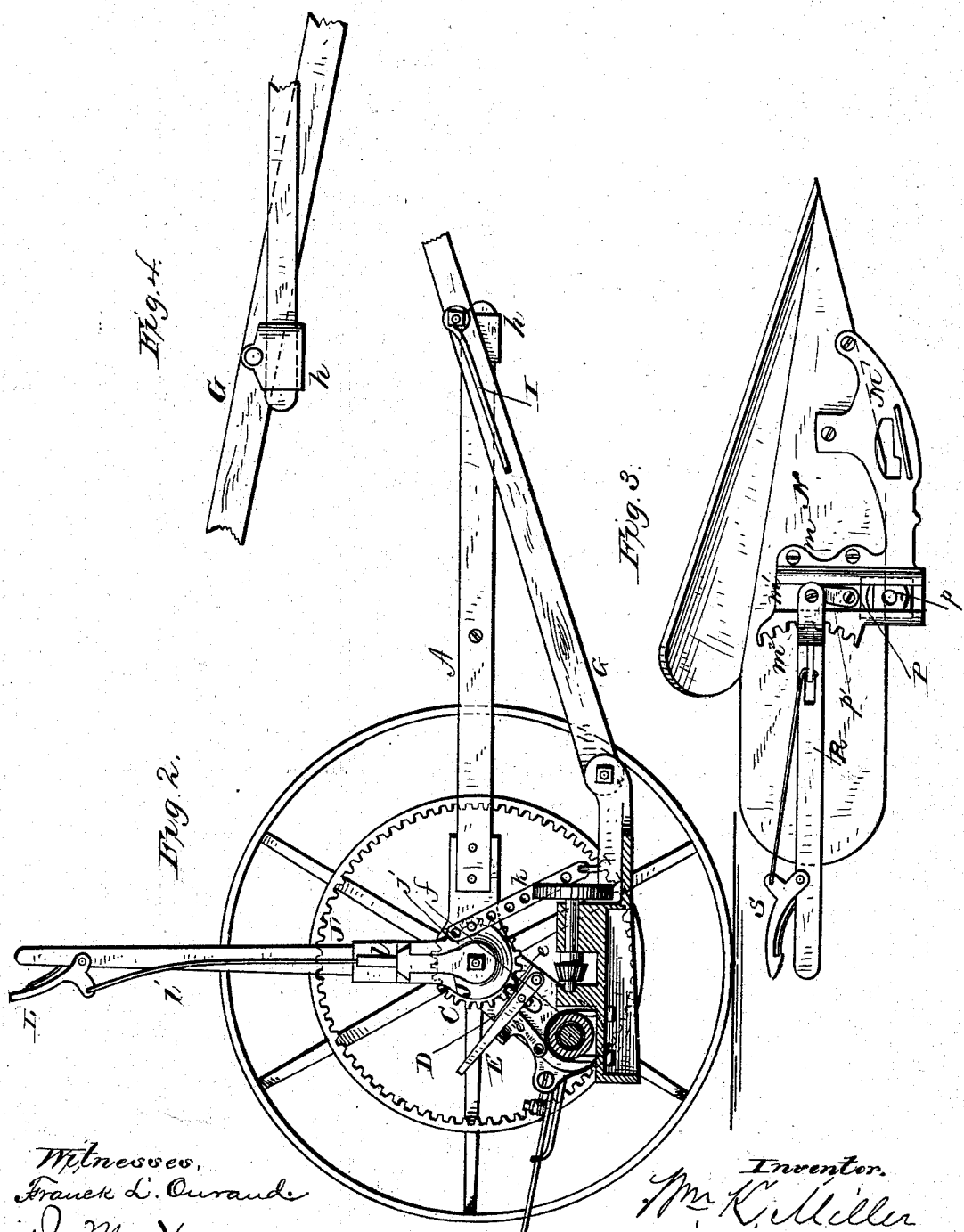

WILLIAM K. MILLER, OF CANTON, OHIO.

REAPING-MACHINE.

SPECIFICATION forming part of Letters Patent No. 252,494, dated January 17, 1882.

Application filed August 5, 1881. (Model.)

*To all whom it may concern:*

Be it known that I, WILLIAM K. MILLER, of Canton, county of Stark, State of Ohio, have invented new and useful Improvements in Reaping-Machines, of which the following is a full, clear, and exact description, reference being had to the accompanying drawings, making part of this specification, in which—

Figure 1 is a perspective view of my improved machine, or so much thereof as is necessary to show my improvements. Fig. 2 represents a vertical longitudinal section through the cutter or gear frame, showing the arrangement of the adjusting devices. Fig. 3 is an elevation, showing the outer shoe and grain or dividing board with the grain-wheel removed; and Fig. 4 is a side elevation of the swiveling block intermediate between the wheel-frame and the pole or tongue.

My invention relates to the means for effecting the adjustment of the cutter-frame and the platform-cutters, &c., of a single drive-wheel reaper; and it consists in a novel construction of jointed or compound frame, and in a novel arrangement of means for adjusting the parts thereof, whereby I am enabled to adjust the cutter-frame, platform, &c., bodily relatively to the ground and main drive-wheel axle, and also to adjust the angle of said frame, and therewith the height of cut, by vibrating it upon a center in rear of the axle.

In the accompanying drawings, A A' represent the "wheel-frame," so called because it has the pin or axle upon which the main drive-wheel is mounted or rotates secured in its rear end. This frame is made preferably of two bars of metal, one, A, lying parallel, or nearly so, with the plane in which the drive-wheel moves and on the grain side thereof, and the other, A', in angular or L shape, so as to bolt to the bar A in front of the wheel and cross the path thereof to the outer side, where it is bent backward into a plane parallel with bar A; and to the rear ends of these bars plates $a$ $a'$ are secured, or they may, if desired, be formed in one piece with them, the rear ends of which have sleeves formed upon them, in which the center-pin or drive-wheel axle rests. The outer bar or plate, $a'$, has a vertical socket formed in it at $a^2$ for the reception of the driver's-seat support, and the inner one upon the sleeve or bearing for the axle has a circular toothed rack or disk, C, formed upon it, surrounding said axle as a center.

D is an axle-frame or frame-bar, to the forward end of which the axle or center-pin D' is secured, said bar being provided at its rear swinging end with an outwardly-projecting sleeve, D², in which the secondary or pinion shaft $d$ has its bearings, the pinion on which, by this arrangement, is adapted to remain always in proper working relation to the cogged rim $b$ of the driving-wheel under any and all adjustments of the frame-bar D. This frame-bar D is provided with a sliding bolt or latch, $e$, adapted to be operated by means of a lever, E, for moving it into or out of engagement with the rack, for locking the bar D to the wheel frame or for releasing it therefrom and permitting its adjustment.

$e'$ is a pivoted locking-latch for holding the lever E, with the latch $e$, engaged with the rack C when the frame-bar D has been adjusted as described.

Upon the sleeve D² is suspended the gear and cutter-frame F by means of suitable loop or eye bearings, $f f'$, which permit a rocking or rolling movement of the sleeve, and also of the frame F on said sleeve, said bearing being formed upon or secured to the frame near its rear or heel end, as shown. The forward end of frame F has perforated lugs formed upon it, in which the rear end of the pole or tongue G is pivoted. The wheel-frame bar A extends forward of its junction with the bar A', and may be bent, as shown at $g$, if required, to bring its forward extension nearly into the same vertical plane with the outer adjacent side of the tongue, its forward end passing through a socket formed in a block or plate, $h$, pivoted on the side of the tongue, (see Fig. 4,) said block serving to guide and steady the movements of said tongue and frame relatively to each other, and to hold them in proper working relation. The same bolt which pivots the socketed block $h$ to the tongue may be employed for securing the forward end of an oblique brace-rod, I, connecting the inner shoe with the tongue, as shown.

Upon the inner end of the center-pin or main axle is mounted loosely a lever-plate, J, provided on its upper side with a socket for the reception of a lever, J', and at an angle of ninety degrees (more or less) thereto, on its forward face, with a short arm having a pin, j, formed upon or secured to it, from which an adjustable link, k, extends downward and forward, its lower end being connected by a hook and eye or equivalent joint with the cutter-frame F at or near its forward end. The plate J is shouldered so as to overhang the ratchet-disk C, a socket or perforation being formed in the shouldered part for the reception of a sliding bolt or latch, l, connected by a rod, l', with a thumb-lever, L, said latch engaging with the disk C for locking the lever-plate J. By this arrangement of the toothed disk C it is adapted to lock both the frame-bar D and the adjusting-lever J' at any desired adjustment. The cutter-frame vibrates upon the sleeve $D^2$ of the frame-bar D as a center, and by rocking the lever J' said frame, together with the platform, which in practice is connected to and vibrates with said frame, may be rocked for adjusting the height of the cutters by varying the angle of the cutter-frame and platform, while by releasing the frame-plate D from the disk C and adjusting it upon the center-pin or axle the height of said frame and of the platform and cutting apparatus may be adjusted bodily as may be required. The link k has a number of perforations formed in it, through any one of which it may be connected with pin j of the lever-plate for adjusting its length to suit the relation of the parts or frames.

The outer shoe, M', of the cutting apparatus has suitable lugs or uprights formed upon it for the attachment of the grain or dividing board N, and the rear one of these (indicated at m) has a vertical groove, m', formed in its outer face, adapting it to receive a sliding block, P, made in T or dovetail shape in horizontal section, conforming to the shape of the groove. The block P has the pin or axle p for the grain-wheel Q formed upon it, and at its upper end has one end of a link, p', connected with it, said link at its opposite end being connected with the forward end of a lever, R, pivoted in rear of the lug m to the grain-board, as shown in Fig. 1. The rear face or edge of the lug or upright m has a curved rack, $m^2$, formed upon it, made in the arc of a circle of which the pivot of lever R is the center, or thereabout, and the lever is provided with a sliding latch, s, operated by means of a thumb-lever, S, and which engages with the rack $m^2$ at any desired adjustment.

By withdrawing the latch s and raising or depressing the rear end of the lever R the outer end of the cutting apparatus and platform can be raised or lowered at will.

By preference the heel-extension of the shoe, on which the upright m is formed, will be such as to bring the groove for the sliding block P, to which the grain-wheel is secured, into or near the same vertical transverse plane with the sleeve $D^2$, on which the cutter-frame and platform vibrate, as above explained, as by said arrangement, when the grain-wheel is properly adjusted to conform to the adjustment of the sleeve $D^2$, the cutter-frame and platform rock upon said sleeve and wheel as a center, and the cutters, instead of being adjusted around the center-pin or main drive-wheel axle, move upon a center in rear thereof up toward or downward away from the horizontal plane of the axle, being near or slightly in advance of the vertical transverse plane thereof.

Aside from the features of construction and arrangement above particularly pointed out, the machine may be constructed and its parts arranged as shown and described in Letters Patent granted to me February 11, 1879, or in any usual or preferred way.

Having now described my invention, I claim—

1. The seat and wheel-frame, in bearings in the rear open end of which the main drive-wheel axle is mounted, provided on its inner arm with a ratchet wheel or disk surrounding the axle-bearing, and having a sliding connection at its forward end with the pivoted tongue or tongue-frame, substantially as and for the purpose described.

2. The combination of the seat and wheel-frame, supported at its rear end upon the drive-wheel axle, the axle-frame secured at its forward end to and vibrating with the axle, the gear and cutter frame connected at its rear end with the rear end of the axle-frame, and at its forward end, through the hinged tongue or tongue-frame, with the forward end of the seat and wheel-frame, substantially as described.

3. The combination of the axle-frame, secured at its forward end to and made adjustable with or upon the drive-wheel axle as a center, the forwardly-projecting cutter-frame hinged to said axle-frame in line with and made adjustable around the pinion-shaft, the wheel-frame provided with the fixed ratchet-disk surrounding the drive-wheel axle and connected at its forward end with the tongue, and the adjusting-lever pivoted and turning on said axle as a center, all arranged and operating substantially as and for the purpose described.

4. The combination of the wheel-frame having the fixed ratchet-disk surrounding the main drive-wheel axle, and connected at its forward end with the hinged tongue or tongue-frame, the axle-frame bar secured to and made adjustable with or upon the axle as a center, and provided at its rear swinging end with a sleeve-bearing for the pinion-shaft, the cutter-frame hinged at its rear end upon said sleeve and at its forward end to the tongue or tongue-frame, and adjusting devices connecting said cutter-frame with the ratchet-disk on the wheel-frame for adjusting and holding the cutter-frame, substantially as described.

5. The combination of the wheel-frame with its ratchet-disk surrounding the axle, the axle-frame secured to and turning with the axle, and provided with means, operating in connection with said ratchet-disk, for holding it at any desired angle of relation to the wheel-frame, the cutter-frame hinged at its rear end to the rear end of the adjustable axle-frame, and connected at its forward end, through the hinged tongue or tongue-frame, with the forward end of the wheel-frame, and means, operating in connection with the ratchet-disk on the wheel-frame, for adjusting and holding said cutter-frame at any desired height, substantially as described.

In testimony whereof I have hereunto set my hand this 2d day of August, A. D. 1881.

WILLIAM K. MILLER.

Witnesses:
 CHAS. R. MILLER,
 PAUL D. RIDER.